United States Patent [19]
Cannon

[11] Patent Number: 5,226,385
[45] Date of Patent: Jul. 13, 1993

[54] METHOD AND APPARATUS FOR INCUBATING AND HATCHING EGGS

[75] Inventor: Robert W. Cannon, Salem, Oreg.

[73] Assignee: The Marmon Corporation of Canada, Ltd., Canada

[21] Appl. No.: 932,163

[22] Filed: Aug. 19, 1992

Related U.S. Application Data

[60] Division of Ser. No. 577,257, Sep. 4, 1990, Pat. No. 5,179,913, which is a continuation-in-part of Ser. No. 324,943, Mar. 16, 1989, Pat. No. 5,025,619.

[51] Int. Cl.[5] .......................................... A01K 41/00
[52] U.S. Cl. ........................................ 119/35; 119/39; 119/43
[58] Field of Search ..................... 119/30, 35, 37, 38, 119/44, 43

[56] References Cited

U.S. PATENT DOCUMENTS

| | | | |
|---|---|---|---|
| 1,861,895 | 6/1932 | Allen | 119/35 |
| 3,006,320 | 10/1961 | Bailey | 119/37 |
| 3,132,735 | 5/1964 | Nilsen | 119/43 |
| 3,225,740 | 12/1965 | Orr | 119/35 |
| 3,396,703 | 8/1968 | Trussell | 119/35 |
| 3,938,472 | 2/1976 | Jauneaud | 119/37 |
| 4,005,679 | 2/1977 | Pas | 119/35 |
| 4,546,729 | 10/1985 | Wormgoor | 119/37 |
| 4,620,504 | 11/1986 | Wormgoor | 119/35 |

FOREIGN PATENT DOCUMENTS

| | | | |
|---|---|---|---|
| 94666 | 1/1960 | Netherlands | 119/35 |
| 96644 | 12/1960 | Netherlands | 119/35 |
| 650583 | 3/1979 | U.S.S.R. | 119/35 |

OTHER PUBLICATIONS

Jamesway, Big J Incubator.

Primary Examiner—John G. Weiss
Attorney, Agent, or Firm—John Carl Gealow; James M. Wetzel

[57] ABSTRACT

An egg tray is provided which holds the eggs at an angle of approximately 35° relative to the horizontal floor of the tray with the large or air-cell end of the egg being elevated. Air vents in the tray sides permit fresh air to flow directly over the eggs during incubation. A hatchery facility includes racks for holding a plurality of such trays loaded with eggs. The loaded racks and are rolled into an incubation and hatching chamber through a first set of doors which connect the chamber to a first hallway in which fresh air is circulated. After incubation and hatching, the racks and an air control unit in each chamber are removed through a second set of doors into a second hallway in which air from the chambers is vented during incubation and hatching. The air pressure in the first hallway is greater than that in the second hallway thereby minimizing the risk of contamination.

19 Claims, 4 Drawing Sheets

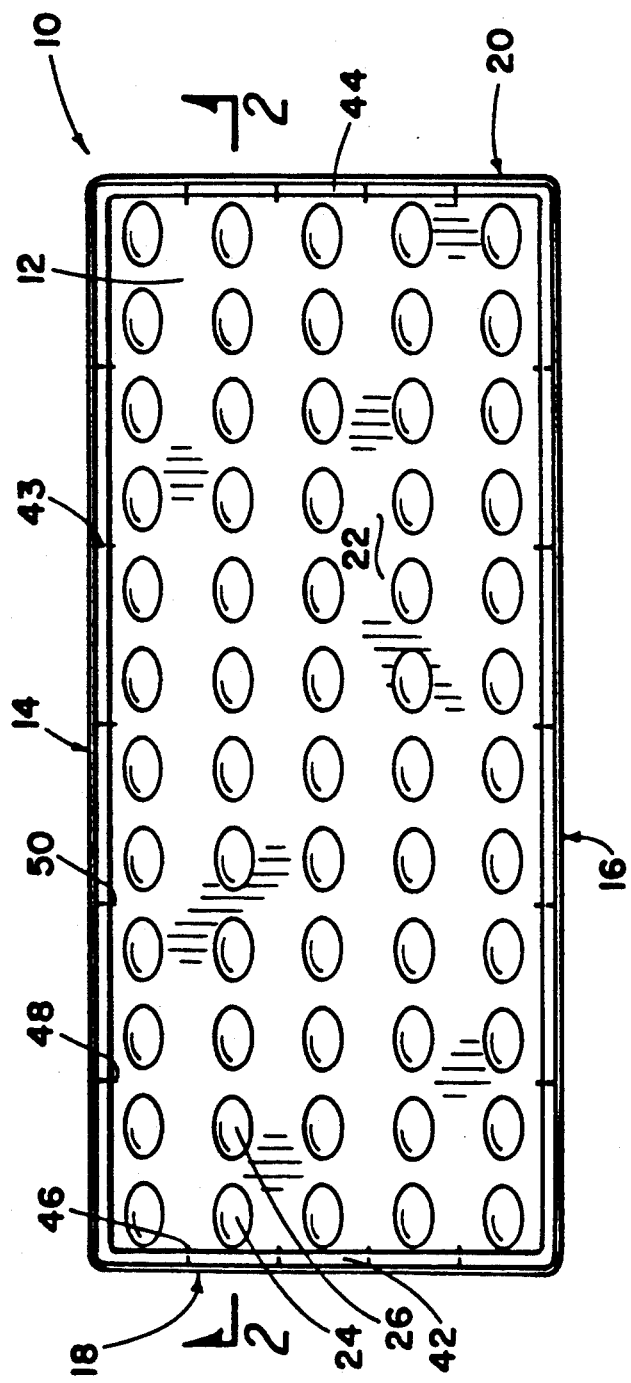
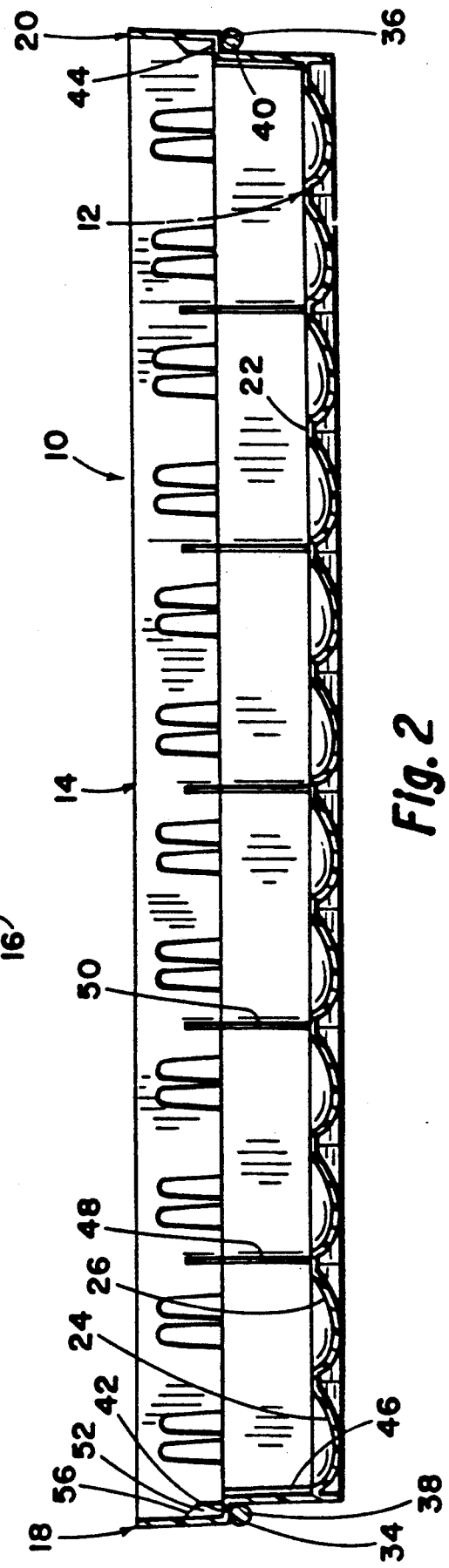

METHOD AND APPARATUS FOR INCUBATING AND HATCHING EGGS

This application is a division of U.S. application Ser. No. 07/577,257, filed Sep. 4, 1990, which issued as U.S. Pat. No. 5,179,913 on Jan. 19, 1993, which is a continuation-in-part of U.S. application Ser. No. 07/324,943, filed Mar. 16, 1990, which issued as U.S. Pat. No. 5,025,619.

BACKGROUND OF THE INVENTION

1. Field of the Invention

The present invention relates to methods and apparatus for incubating and hatching eggs and more particularly to such methods and apparatus in which trays holding a plurality of eggs are received in a controlled environment for promoting incubation and hatching.

2. Description of the Related Art

Trays for receiving eggs during the incubation process have been in use for many years. Generally speaking, a tray is loaded with freshly-laid eggs and is thereafter received in a rack or the like along with a number of other loaded egg trays. The rack is positioned in a chamber in which the environment, especially temperature and humidity, is controlled to maximize the number of chicks hatched from the eggs. Most, but not all, incubation and hatching methods involve incubating in a first tray which is designed to optimize incubation conditions. Just prior to hatching, the eggs are transferred to a second hatching tray which is designed to accommodate the hatched chicks. Prior art methods include placing the egg on a substantially planar surface in an egg tray.

During incubation, the trays are tilted about a horizontal axis to simulate the same egg movement caused by a hen, through the use of her beak and feet, in a nest Such movement is important during the incubation process because the chick embryo floats for about the first 14 days of incubation and will stick to the upper surface of the egg and die if the egg is not rotated. On about the 14th day of incubation the chick orients itself with its head in the end of the egg which is tilted upwardly, which should be the large end containing the air cell.

During hatching, which occurs on about the 21st day of incubation, the chick uses its beak to peck through the egg shell along a circle near the air-cell end of the egg and substantially coaxial with the longitudinal axis of the egg. The end of the egg is thus removed and the chick can emerge from the egg.

If the small end of the egg is tilted up when the chick positions itself the chick may malposition with its head in the small end of the egg. When the chick first pips the shell and begins to breathe, it will drown. Even with the chick's head positioned in the air-cell end, if any part of the egg through which the chick must peck is against another object, such as the floor of the egg tray or an adjacent egg, the chick may not be able to peck through the shell and thus dies.

Sometimes the egg tray tilting which must be undertaken during incubation causes the eggs to roll against one another or the egg tray in a manner which may prevent chick hatching as described above. The small end of one egg may ride up onto an adjacent egg or a portion of the tray thereby tilting the longitudinal axis of the egg so that the air-cell end is against the floor of the tray. If the small egg end is higher than the air-cell end, the problems described above may develop.

Prior art egg trays and incubation and hatching methods thus suffer from disadvantages which reduce the yield and quality of hatched chicks.

In addition to the foregoing described problems, the yield of hatched chicks is also reduced as a result of contamination in the incubation chamber. A typical hatchery includes a number of incubation chambers into which portable racks of loaded egg trays are placed for incubation and hatching.

In some methods, the incubation chamber holds eggs at widely varying stages of incubation. The racks supporting the egg trays are serially moved through the incubator with a rack at one end having fresh eggs and with eggs in a rack at the other end being ready to hatch. In such a method the doors to the incubator chamber are opened and closed a number of times during incubation. This permits contamination from chick down and waste to spread from other parts of the hatchery into the chamber.

In other hatchery methods, an incubation chamber is loaded with racks containing fresh eggs and the incubation process is begun. Thus, the doors to the incubation chamber are not opened during incubation, unless it is a system in which the eggs are transferred from incubator trays to hatching trays prior to hatching. Down and waste contamination can, however, enter the chamber when the racks bearing the fresh eggs are first placed in the chamber.

SUMMARY OF THE INVENTION

In one aspect, the present invention comprises a tray for incubating and hatching eggs which includes a plurality of curved surfaces formed on the tray bottom for holding an egg so that the longitudinal axis of the egg forms an acute angle relative to the tray bottom with the air-cell end of the egg being further from the tray bottom than the other end.

In another aspect of the invention, a facility for incubating and hatching eggs is provided which includes a first plenum filled with fresh air. An egg incubating and hatching chamber receives an egg rack from the first plenum. Fresh air is communicated from the first plenum to the chamber during egg incubation and hatching. The rack is movable from the chamber into a second plenum after incubation and hatching. During incubation and hatching chamber air is exhausted into the second plenum.

It is a general object of the present invention to provide a method and apparatus for incubating and hatching eggs which overcomes the above-enumerated disadvantages associated with prior art methods and apparatus.

It is another object of the present invention to provide an improved tray in which eggs can be both incubated and hatched.

It is a more specific object of the present invention to provide such a tray which improves the yield and quality of hatched chicks.

It is yet another object of the present invention to provided such a method and apparatus which reduces egg contamination during incubation thereby increasing the yield and quality of hatched chicks.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a top plan view of a tray for incubating and hatching eggs constructed in accordance with the present invention.

FIG. 2 is an enlarged sectional view taken along line 2—2 in FIG. 1.

DETAILED DESCRIPTION OF THE PREFERRED EMBODIMENT

Turning now to the drawings and considering FIGS. 1 and 2, indicated generally at 10 is a tray for incubating and hatching eggs. Tray 10 is constructed in accordance with the present invention. The tray includes a bottom 12 and side walls 14, 16, 18, 20.

Figure 3:
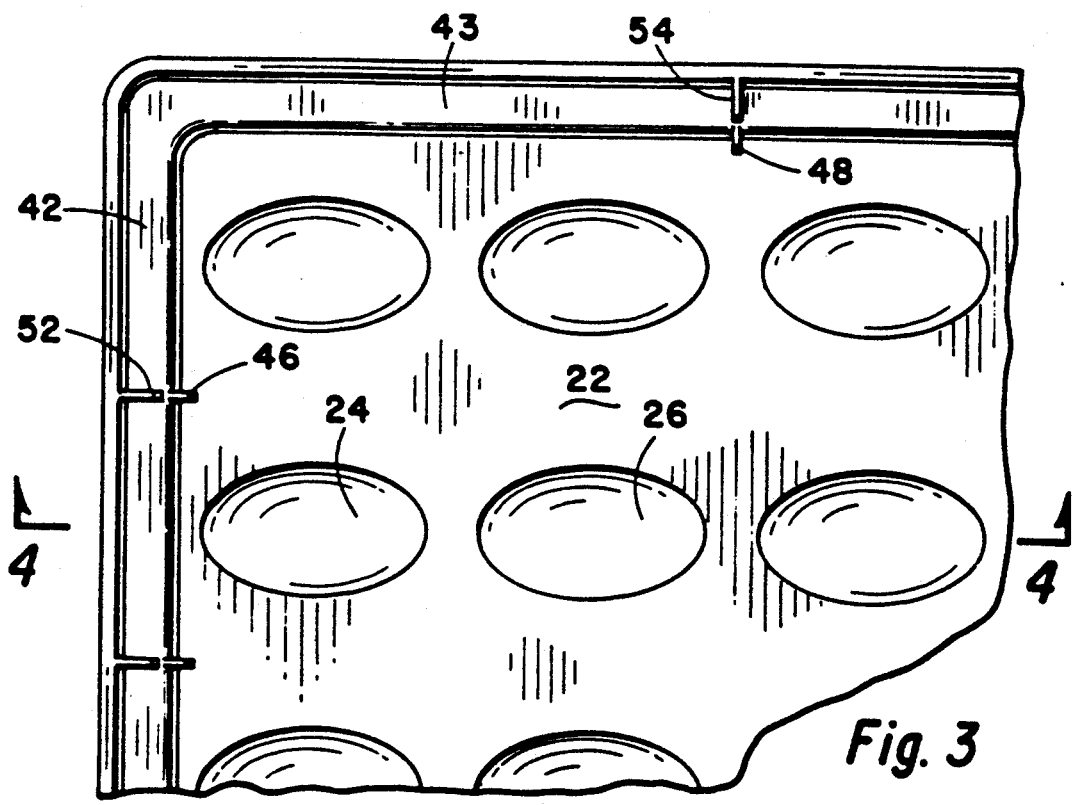
FIG. 3 is an enlarged, partial plan view of the egg tray of FIG. 1 stacked on and nested within another such egg tray.

Bottom 12 includes what is referred to herein as a horizontal egg support surface 22. The egg support surface is bounded by side walls 14–20 and includes five rows and 12 columns of egg-holding recesses, like recesses 24, 26. The egg-supporting recesses are also referred to herein as holding means or curved surfaces. As can perhaps be best viewed in FIG. 4, surfaces 24, 26 are each asymmetrical in shape and are formed so as to hold an egg, like egg 28 (shown in dot-dash lines), with its narrow end tilted downwardly relative to surface 22 and its big or air-cell end tilted upwardly as illustrated in FIG. 3.

Figure 4:
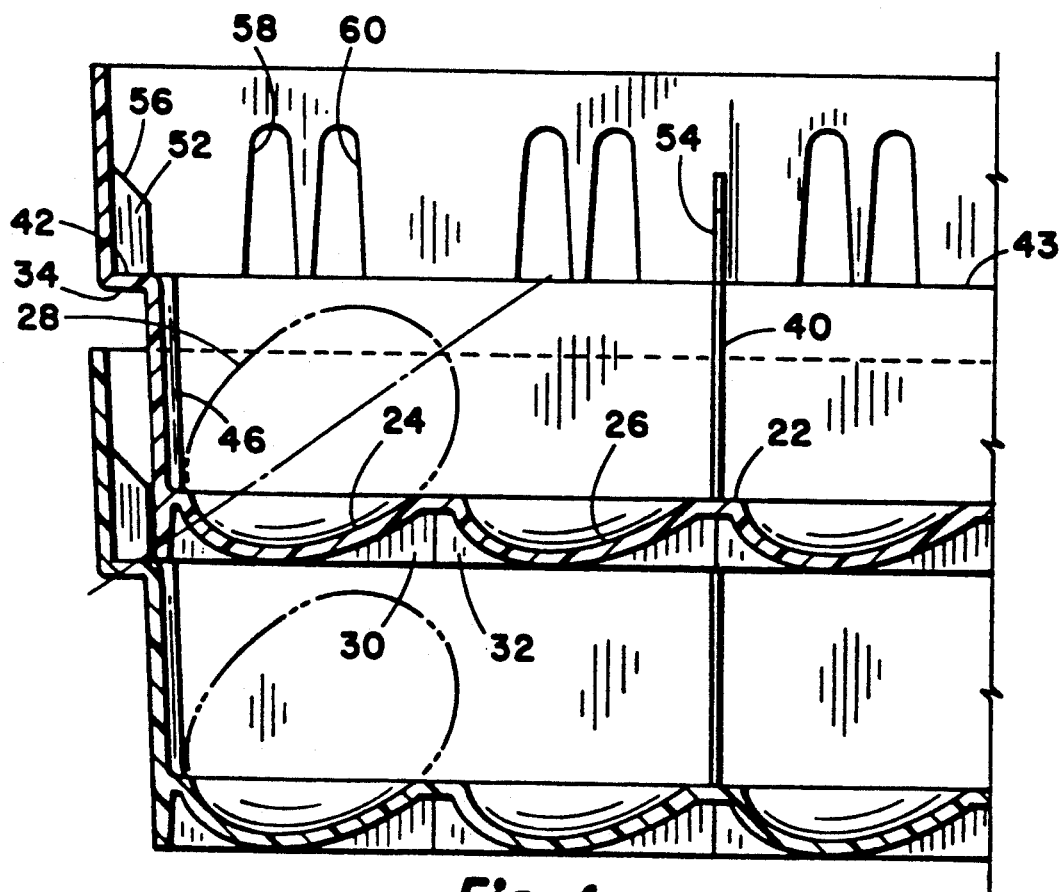
FIG. 4 is a view taken along line 4—4 in FIG. 3.
Figure 5:
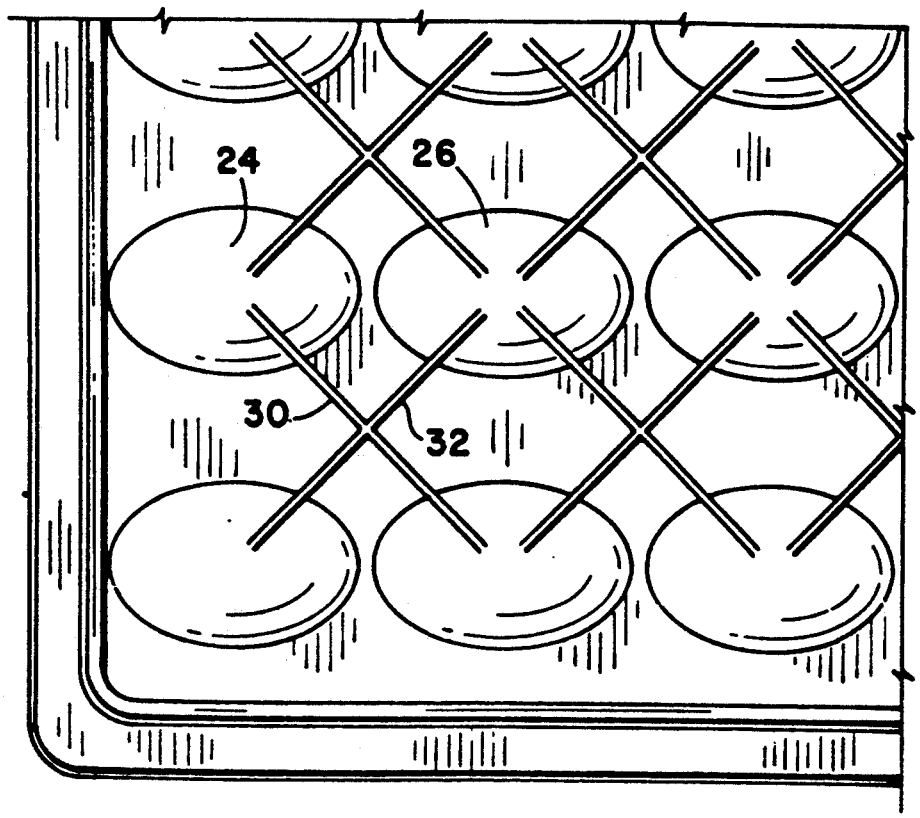
FIG. 5 is a partial, bottom plan view of the upper egg tray in FIG. 3.

As can be seen in FIGS. 2, 4 and 5, the underside of bottom 12 includes reinforcing webs, like webs 30, 32. The underside of each web is substantially coplanar with the underside of all the other webs on bottom 12. Such structure provides a flat lower surface for supporting tray 10 when the same is set on a flat surface.

Each of the side walls include a downwardly-directed exterior shoulder, like shoulders 34, 36 on walls 18, 20, respectively. As can be seen in FIG. 2, the shoulders are constructed to cooperate with rods 38, 40 on a conventional rack (not shown) for supporting a plurality of egg trays like tray 10.

Each of the side walls further includes an upwardly-directed interior shoulder, like shoulders 42, 43, 44 on side walls 18, 14, 20, respectively. Vertical support webs, like webs 46, 48, 50, extend from surface 22 at the lower end each web to the plane of the upwardly-directed shoulders, like shoulders 42, 43, at the upper end of each web. The upper end of each of the webs, like webs 46, 48, thus comprises a portion of its associated upwardly-directed shoulder, like shoulders 42, 43, respectively.

Associated with each support web is a guiding means or guide web, like guide webs 52, 54 are associated with support webs 46, 48, respectively. Each of the guide webs includes an upper surface, like upper surface 56 on web 52, which extends between an upper web position adjacent the side wall upon which the guide web is formed to a lower interior position. As will later become more fully apparent, when the bottom of one tray like tray 10 is lowered into the top of another tray, also like tray 10, the guide webs serve to center the upper tray relative to the lower tray so that the lower surface of the upper tray side walls is guided to the upper surface of the support webs on the lower tray. This configuration is illustrated in FIG. 4.

A plurality of air vents, like vents 58, 60 are disposed in each side wall and extend upwardly from shoulder 43 as shown. Each side wall includes a pair of such vents aligned with the recesses, like recesses 24, 26, in each of the rows and columns. It can thus be seen that air is free to circulate directly above eggs received in the recesses in a first direction between walls 14, 16 and at right angles thereto, between walls 18, 20.

Figure 6:
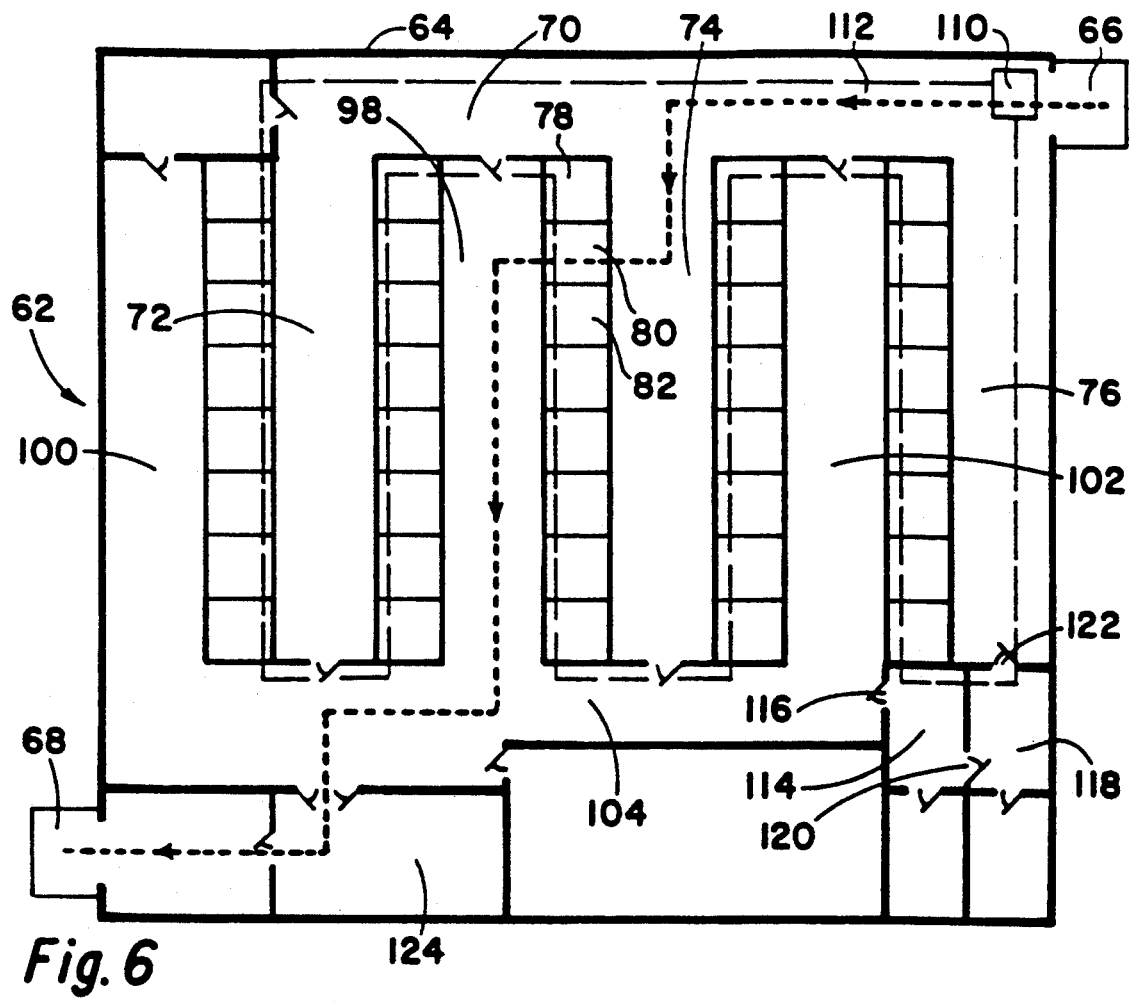
FIG. 6 is a partially diagrammatic plan view of a hatchery facility constructed in accordance with the present invention.
Figure 7:
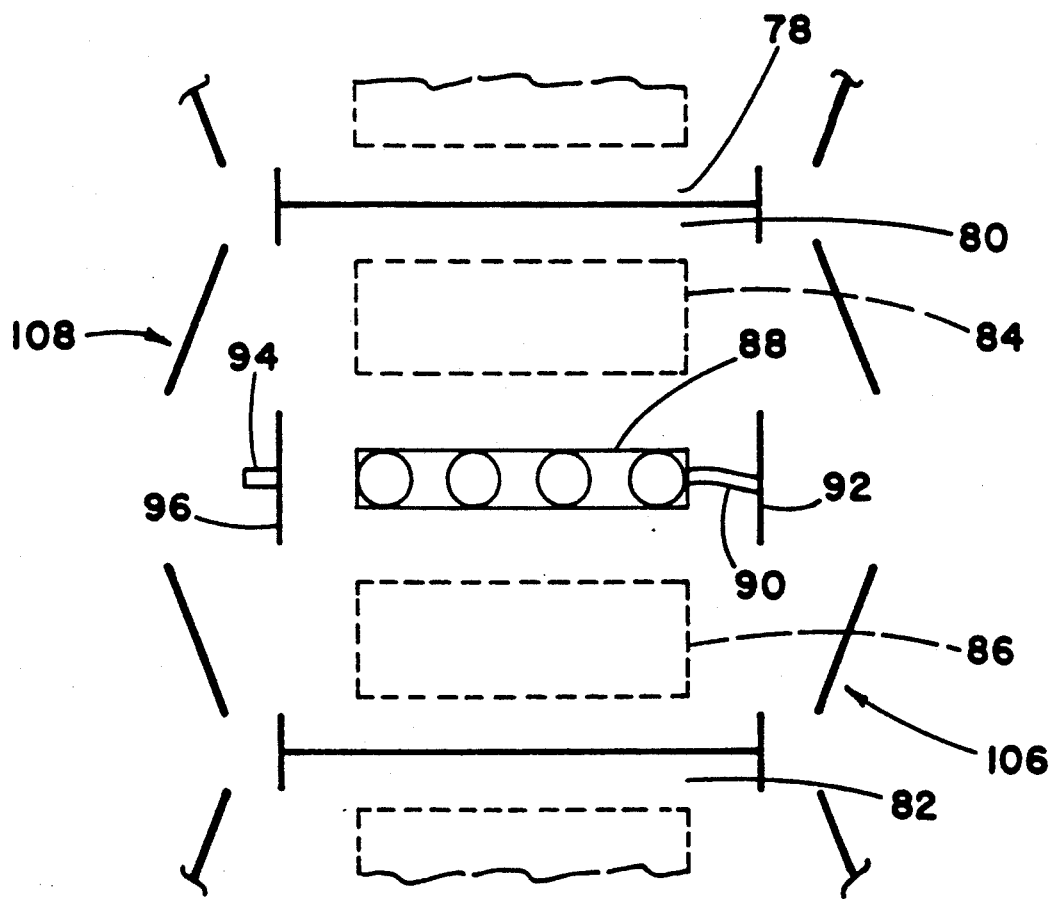
FIG. 7 is an enlarged partial view of the hatchery facility of FIG. 6.

Turning now to FIGS. 6 and 7, consideration will be given to structure and operation of a hatchery facility, indicated generally at 62 in FIGS. 6, in which trays like tray 10 may be utilized to hold eggs during hatching and incubation. The facility is bounded by an exterior wall 64. An egg unloading dock 66 facilitates unloading of eggs from vehicles, preferably carried in trays like tray 10 and stacked as illustrated in FIG. 4. A chick loading dock 68 permits loading of hatched chicks from facility 64 onto vehicles for transport to farms where the chicks are raised.

The hatchery includes hallways 70, 72, 74, 76 which comprise what is referred to herein as a first plenum. Hallways 70–76 are provided with a flow of fresh air from a conventional air-treatment system not shown). The hallways are isolated from the atmosphere outside the facility via conventional air locks (also not shown) incorporated into hatchery 64. A plurality of egg incubating and hatching chambers, three of which are chambers 78, 80, 82 are provided along hallways 72, 74, 76. FIG. 7 comprises an enlarged and more detailed, but still schematic, view of chamber 80 and portions of 78, 82.

Each of the egg chambers, like chamber 80, is constructed substantially in accordance with the incubation chamber illustrated in co-pending U.S. patent application Ser. No. 07/324,943 filed Mar. 16, 1989 for A Method and Apparatus for Incubating and Hatching Eggs (the "'943 application"), which application is incorporated herein by reference. Generally speaking, and with reference to FIG. 7, chamber 80 includes a pair of egg-tray racks 84, 86, illustrated in dashed lines, which are of conventional construction. Racks 84, 86 are mounted on wheels (not shown) and are rollable to different locations within hatchery 64. Each of racks 84, 86 support a plurality of egg trays, like tray 10, via supporting rods, like rods 38, 40 in FIG. 2, on the racks.

Chamber 80 further includes an air control unit 88 constructed in accordance with the '943 application. A hose 90 is mounted on one end of the air control unit and is releasably connected at the other end to a wall 92 which makes up one side of hallway 74. A port (not visible) formed in wall 92 permits communication of air in hallway 74 to air control unit 88 via hose 90.

A cold water supply hose (not shown) and a cold water return hose are also connected to the air control unit as are hot water supply and return hoses for regulating the temperature in chamber 80 as described in the '943 application. The water hoses are releasably connected to water supply and return lines in each chamber as described in more detail hereinafter. To simplify the drawing herein the water hoses are not illustrated.

Fans, as described in the '943 application, mounted on air control unit 88 circulate air in chamber 80.

A vent pipe 94 is formed on a wall 96 which makes up one side of a hallway 98 (in FIG. 6). Hallway 98 along with hallways 100, 102, 104 comprise what is referred to herein as a second plenum.

Vent pipe 94 is constructed and operates in the same manner as the vent pipe in the '943 application which, however, is shown on the ceiling of the incubation and hatching chamber.

Chamber 80 further includes a first set of doors 106 and a second set of doors 108 Doors 106, 108 are also referred to herein as sealable openings. As will be hereinafter explained, the doors permit movement of racks 84, 86 and air control unit 88 from hallway 74 into chamber 80 while doors 108 permit movement of the racks and air control unit from the chamber into hallway 98.

Considering again FIG. 6, a conventional heat exchanger 110 is connected to piping 112, shown only diagrammatically, for providing a cold water supply line to each of the chambers, like chamber 80. Similarly, a cold water return line runs from each chamber back to exchanger 110 where heat is removed therefrom and released into hatchery 64 thereby regulating the temperature in the chambers, as described in the '943 application, and heating the remainder of hatchery 64.

Hatchery 64 further includes a washroom 114, which is connected to hallway 104 via door 116. A clean-room 118 is connected to washroom 114 by a door 120 and to hallway 76 by a door 122. A chick-room 124 receives hatched chicks prior to loading the same on dock 68. Other rooms in hatchery 64 are provided for a shop and mechanical facilities as well as office space.

Consideration is now given to the manner in which trays, like tray 10, are used in connection with hatchery 64. Initially, fresh fertilized eggs are laid in a plurality of trays, like tray 10 in FIG. 4, in the tray upon which it is stacked. As can be seen in FIG. 4, the longitudinal axis of each of the eggs, like egg 28, is at an angle of approximately 35° with respect to surface 22 and the large or air-cell end of egg 28 is tilted upwardly. Preferably the angle is approximately 35°. An angle of 20°; however is sufficient to obtain the beneficial results of the present invention.

Once a number of trays are so loaded and stacked, the same are transported to facility 64 whereupon they are unloaded at dock 66. At the dock the same are loaded onto egg racks, like racks 84, 86. When received upon the rods, like rods 38, 40 (in FIG. 2), which support the egg trays in the racks, each rack is separated from the rack therebelow by a space sufficient for a chick to stand upright on surface 22. Such spacing provides a gap between the uppermost portion of one tray and the lowermost portion of the tray thereabove thereby also permitting fresh air to circulate immediately over and around the head of a chick standing on surface 22. As will be recalled, the vents, like vents 58, 60, permit circulation of air directly over the eggs prior to hatching.

When the racks are so loaded, they are rolled substantially along the dotted line in FIG. 6 and into chamber 80 through open doors 106 whereupon the doors are closed.

Thereafter, the twenty-one day incubation process starts during which air control unit 88 regulates temperature and humidity as described in the '943 application. During such incubation, it is necessary to tilt the egg trays in order to prevent the embryo in each egg from sticking to the upper surface of the egg. Racks 84, 86, include a conventional mechanism for tilting the egg trays to achieve this end. The angle of tilt is sufficient to prevent the embryo from sticking but is not so great as to cause eggs to roll out of their recesses, like recess 24. The position of each egg thus remains completely unchanged with the eggs remaining separate from one another after tray tilting.

After incubation, during which time the environmental conditions in chamber 80 are regulated as set forth in the '943 application and the trays are tilted by the racks in accordance with a known procedure, the chicks hatch. The manner in which a chick pips through the shell of an egg is illustrated by the broken shell of egg 28 in FIG. 4. As can be seen, the chick pips through the shell in a substantially circular pattern which is substantially coaxial with the axis of the egg.

During incubation, fresh air is provided to chamber 80 from hallway 76 via hose 90. The air is humidified and heated or cooled by air control unit 88 as set forth in the '943 application. Air is vented from chamber 80 via vent pipe 94, also as set forth in the '943 application.

It should be noted that the air pressure in hallway 76, and the other areas which make up the first plenum, is maintained at a higher pressure than the pressure in hallway 102, and the related areas which make up the second plenum. If any opening between the plenums occurs, flow therefore is from the first or fresh air plenum to the second or exhaust plenum. This feature is important because air is vented, via air vent 94, into hallway 102. In addition, after hatching, the chicks are removed into hallway 102 via doors 108. Hallway 102 and the related areas making up the second plenum are thus contaminated by down, waste and any bacteria developed in the trays during incubation. If there should be an opening between the first or fresh air plenum and second plenums, flow is thus always from the first plenum to the second plenum thereby preventing contamination of the fresh air.

Upon removal from chamber 80 the chicks are taken to chick room 124 where they reside temporarily until loaded onto a vehicle from dock 68 for transport from the hatchery. The dotted line beginning on dock 66 and ending on dock 68 thus illustrates the path of eggs and, after incubation and hatching in chamber 80, the chicks through the hatchery facility.

After the chicks are removed from chamber 80, the water hoses (not shown) are disconnected from air control unit 88 as is hose 90 and unit 88 is rolled out of chamber 80 via doors 108 and into washroom 114 for a thorough cleaning. The clean unit is thereafter rolled via door 120 into clean room 118 and from there, when needed, to one of the incubation chambers, like chamber 80.

Also, after the egg tray racks and air control unit are removed from chamber 80, cleaning equipment is brought into hallway 98 and the interior of the chamber is thoroughly cleaned and scrubbed by entering the same through doors 108. During this time doors 106 remain closed thus isolating the chamber from the fresh air plenum. After such cleaning, doors 108 are closed and doors 106 opened to receive a clean air control unit and two additional egg trays.

It should be noted that throughout incubation and hatching both doors 106, 108 remain closed thereby reducing the risk of contamination in the egg chamber. Since it is not necessary to transfer the eggs from an incubation tray to a hatching tray the risk of contamination is lowered as is the risk of damaging the eggs through additional handling. Because all of the eggs in the chamber begin incubation at the same time it is not necessary to open and close the doors to remove chicks which have hatched from some of the eggs while adding new eggs to begin incubation as in some prior art systems.

Because the chamber and air control unit are thoroughly cleansed between each incubation and hatching cycle, the risk of contamination is further reduced. In addition, all of the surfaces in the second plenum, i.e., hallways 98-104, can be thoroughly scrubbed several times a day if desired to further reduce the possibility of contamination. Because fresh air is supplied to each chamber, and vented therefrom, without the use of ducts, cleaning is much easier than is the case when ducts are present in which dirt, bacteria and the like tend to accumulate and thus increase the possibility of contamination.

Use of the egg trays and hatchery facility of the present invention thus increases the yield and quality of hatched chicks.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A facility for incubating and hatching eggs comprising:
    an egg incubating and hatching chamber in which eggs are incubated and hatched;
    a first plenum in fluid communication with said chamber for providing a flow of fresh air into said chamber;
    a second plenum in fluid communication with said chamber for receiving a flow of fresh air into said chamber;
    a first sealable opening between said first plenum and said chamber, said first opening permitting a plurality of eggs to be moved from said first plenum into said chamber when said first opening is unsealed; and
    a second sealable opening between said second plenum and said chamber, said second opening permitting a plurality of eggs to be moved from said chamber into said second plenum when said second opening is unsealed.

2. The facility of claim 1 wherein said facility further includes a plurality of said chamber, each being in fluid communication with said plenums and having such first and second sealable openings.

3. The facility of claim 1 wherein the pressure in said first plenum is maintained at a higher pressure than the pressure in said second plenum.

4. The facility of claim 1 wherein said facility further includes a portable egg rack for moving a plurality of eggs into and out of said chamber via said first and second openings, respectively.

5. The facility of claim 2 wherein said first and second plenums comprise first and second rooms.

6. A method for incubating and hatching eggs comprising the steps of:
    providing fresh air to a first plenum;
    loading an egg rack with a plurality of eggs;
    moving the rack through the first plenum to an egg incubating and hatching chamber in fluid communication with said first plenum;
    moving the rack from the first plenum into the chamber;
    incubating the eggs in the chamber until the same are hatched;
    exhausting chamber air into a second plenum during incubation and hatching; and
    moving the rack from the chamber into the second plenum after the eggs are hatched.

7. The method of claim wherein said method further includes the step of maintaining the pressure in said first plenum higher than that in said second plenum.

8. The method of claim 6 wherein said method further includes the step of periodically scrubbing and washing said second plenum.

9. The method of claim 6 wherein the step of moving the rack from the first plenum into the chamber comprises the steps of:
    opening a first door to the egg chamber;
    moving the rack through the open door into the chamber; and
    closing the first door.

10. The method of claim 6 wherein the step of moving the rack from the chamber into the second plenum after the eggs are hatched comprises the steps of:
    opening a second door to the egg chamber; and
    moving the rack through the open door into the second plenum.

11. The method of claim 10 wherein said method further includes the steps of:
    moving cleaning equipment through the second plenum and into the egg chamber via the second door; and
    scrubbing and washing the egg chamber.

12. The method of claim 6 wherein said method further comprises the step of circulating hot and cold water through the chamber for regulating chamber temperature during incubation.

13. The method of claim 12 wherein said method further includes the step of using the circulating water to provide heat for a building in which the chamber is located.

14. A facility for incubating and hatching eggs comprising:
    a first plenum filled with fresh air;
    an egg rack;
    an egg incubating and hatching chamber;
    means for permitting rack movement from said first plenum into said chamber;
    means for communicating fresh air from said first plenum to said chamber during egg incubation and hatching;
    a second plenum;
    means for exhausting chamber air into said second plenum during incubation and hatching; and
    means for permitting rack movement from said chamber into said second plenum after incubation and hatching.

15. The facility of claim 14 wherein said means for permitting rack movement from said first plenum into said chamber comprises a door.

16. The facility of claim 14 wherein said means for permitting rack movement from said chamber into said second plenum after incubation and hatching comprises a door.

17. The facility of claim 14 wherein said facility further includes means for maintaining the pressure in said first plenum at a higher level than the pressure in said second plenum.

18. The facility of claim 14 wherein said facility further includes means for circulating hot and cold water through the chamber for regulating chamber temperature.

19. The facility of claim 18 wherein said facility further includes a heat exchanger for extracting heat from water which has been circulated through said chamber during egg incubation.

* * * * *

UNITED STATES PATENT AND TRADEMARK OFFICE
CERTIFICATE OF CORRECTION

PATENT NO. : 5,226,385

DATED : July 13, 1993

INVENTOR(S) : Robert W. Cannon

It is certified that error appears in the above-identified patent and that said Letters Patent is hereby corrected as shown below:

Column 8, line 12:

Claim 7, line 1, after the word claim insert the numeral -6-

Signed and Sealed this

Fifteenth Day of February, 1994

*Attest:*

BRUCE LEHMAN

*Attesting Officer*     *Commissioner of Patents and Trademarks*